(12) United States Patent
Su Yu et al.

(10) Patent No.: US 7,283,188 B2
(45) Date of Patent: Oct. 16, 2007

(54) COMPENSATOR COMPRISING A POSITIVE AND NEGATIVE BIREFRINGENT RETARDATION FILM

(75) Inventors: Jeong Su Yu, Daejon (KR); Sergey Vasilyevich Belyaev, Dolgoprudniy (RU); Byoung Kun Jeon, Chungcheongnam-do (KR); Karl Skjonnemand, Southampton (GB); Tara Perrett, Bournemouth (GB); Owain Parri, Dorset (GB)

(73) Assignees: Merck Patent GmbH, Darmstadt (DE); LG Chemical Ltd., Seoul (KR)

( * ) Notice: Subject to any disclaimer, the term of this patent is extended or adjusted under 35 U.S.C. 154(b) by 0 days.

(21) Appl. No.: 10/440,418

(22) Filed: May 19, 2003

(65) Prior Publication Data

US 2004/0051831 A1    Mar. 18, 2004

(30) Foreign Application Priority Data

May 17, 2002   (EP)   .................... 02010984

(51) Int. Cl.
*G02F 1/1335* (2006.01)
*G02F 1/13363* (2006.01)
*G02B 5/30* (2006.01)

(52) U.S. Cl. ........................ 349/117; 349/121; 428/1.1; 428/1.3; 428/1.31; 428/1.5

(58) Field of Classification Search ................. 428/1.1, 428/1.3, 1.31, 1.5; 252/299.01; 349/117, 349/121

See application file for complete search history.

(56) References Cited

U.S. PATENT DOCUMENTS

| | | | | |
|---|---|---|---|---|
| 6,141,075 A | * | 10/2000 | Ohmuro et al. | ............. 349/130 |
| 6,281,956 B1 | | 8/2001 | Ohmuro et al. | |
| 6,903,789 B1 | * | 6/2005 | Cutler et al. | ................. 349/119 |

FOREIGN PATENT DOCUMENTS

| | | |
|---|---|---|
| EP | 0 538 796 A1 | 4/1993 |
| EP | 0 768 560 A1 | 4/1997 |
| JP | 2002 90530 | 3/2002 |
| WO | WO96/10774 | 4/1996 |
| WO | WO 01/20393 * | 3/2001 |

OTHER PUBLICATIONS

English translation by computer for JP 2002-90530, http://www4.ipdl.ncipi.go.jp/Tokujitu/PAJdetail.ipdl?N0000=60&N0120=01&N2001=2&N3001=2002-090530.*
JP2002090530A2—English Abstract of Japan.

* cited by examiner

*Primary Examiner*—Shean C. Wu
(74) *Attorney, Agent, or Firm*—Millen, White, Zelano & Branigan, P.C.

(57) ABSTRACT

The invention relates to a compensator comprising a positive and a negative birefringent retardation film, its use in displays and optical elements, and to displays comprising such a compensator.

20 Claims, 4 Drawing Sheets

COMPENSATOR COMPRISING A POSITIVE AND NEGATIVE BIREFRINGENT RETARDATION FILM

FIELD OF THE INVENTION

The invention relates to a compensator comprising a positive and a negative birefringent retardation film, its use in displays and optical elements, and to displays comprising such a compensator.

BRIEF DESCRIPTION OF THE DRAWINGS

Various features and attendant advantages of the present invention will be more fully appreciated as the same becomes better understood when considered in conjunction with the accompanying drawings.

FIG. 2 shows the relative orientations of polarizer transmission axes in the display of FIG. 1A when viewed on-axis (2A) and in 45° directions (2B).

FIG. 3 shows a typical iso-luminance plot (3A, luminance versus viewing angle) and iso-contrast plot (3B, contrast versus viewing angle) of a display as depicted in FIG. 1A.

BACKGROUND AND PRIOR ART

Compensators comprising retardation films with positive and negative birefringence for use in liquid crystal displays (LCD) are known in prior art.

Figure 1A:
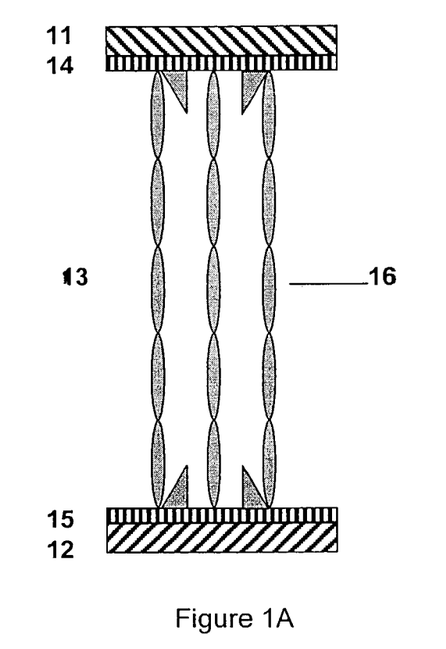
FIG. 1A schematically depicts an uncompensated MVA-LC display.

For example, in LCDs of the vertically aligned (VA) mode it is necessary to compensate the undriven homoeotropic state. Transmission type, VA-mode LCD's can be considerd as controllable retardation layers sandwiched between crossed polarizers. FIG. 1A depicts a typical VA-LCD comprising two polarizers 11 and 12 with crossed optical axes sandwiching a liquid crystal (LC) cell 13 with an LC medium between two substrates 14 and 15 that are covered by transparent electrode layers. The LC medium has a negative dielectric anisotropy $\Delta\epsilon$ and exhibits homeotropic orientation in the undriven state, i.e., the LC molecules 16 are oriented substantially perpendicular to the substrates, which is usually achieved by alignment layers provided on the surfaces of the substrates 14 and 15 that are in contact wth the LC medium. In multidomain (MVA) LCDs the LC cell is additionally divided into multilple, typically four, perpendicular domains. When applying a voltage to the electrodes, the LC molecules in the LC medium will orient sustantially parallel to the substrates due to the negative $\Delta\epsilon$. In case of MVA displays the director, i.e., the preferred direction of the long molecular axes of the LC molecules, will additionally be oriented into different directions in the domains, which provides symmetrical viewing angle characteristics and good color performance. The formation of multiple domains in MVA-LCDs can be achieved by various methods that are known in the art, like for example, by special surface treatment of the alignment layers, by applying slots into the electrodes, or by adding polymeric material into the LC cell.

Figure 1B:
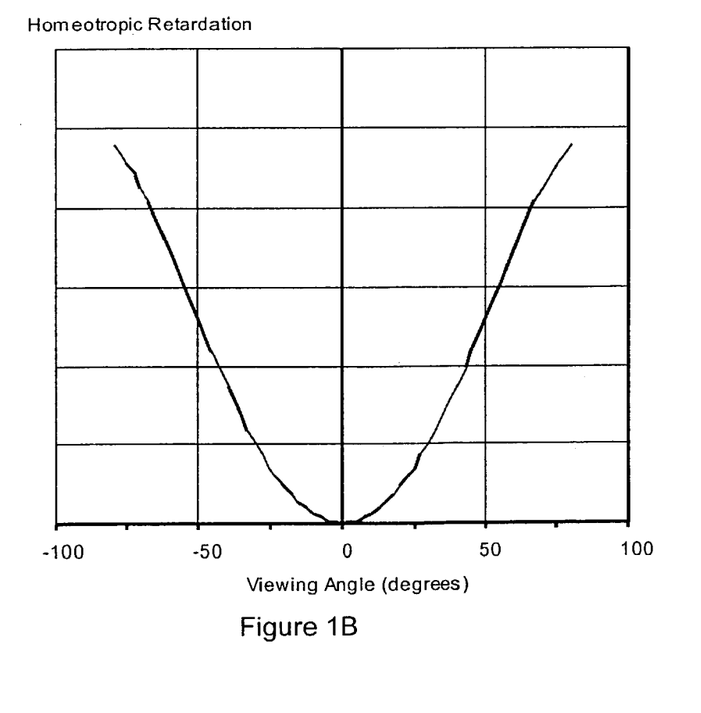
FIG. 1B shows the retardation profile of the LC material in the display of FIG. 1A.
Figure 2A:
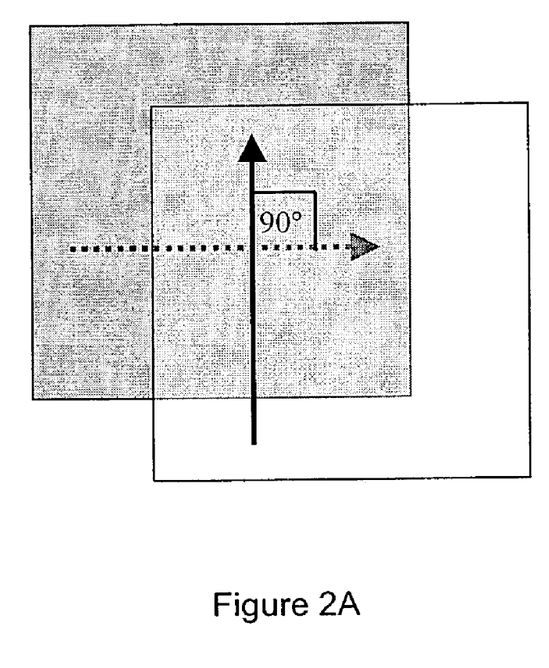
Figure 2B:
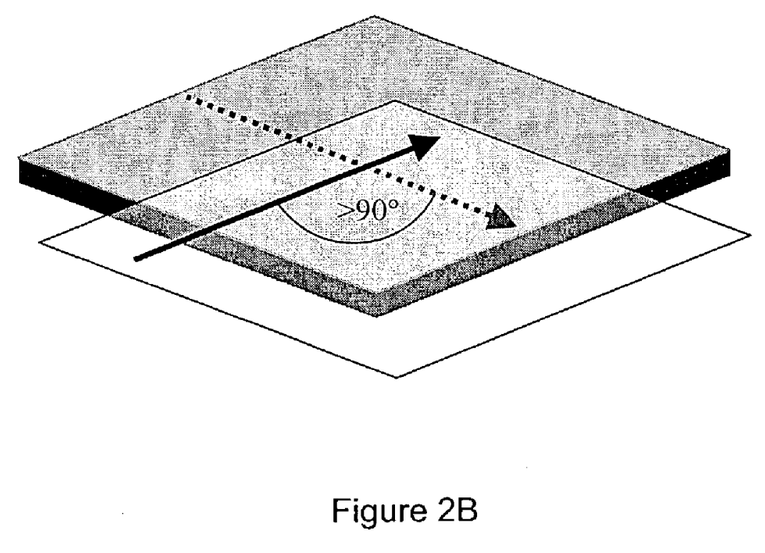
Figure 3A:
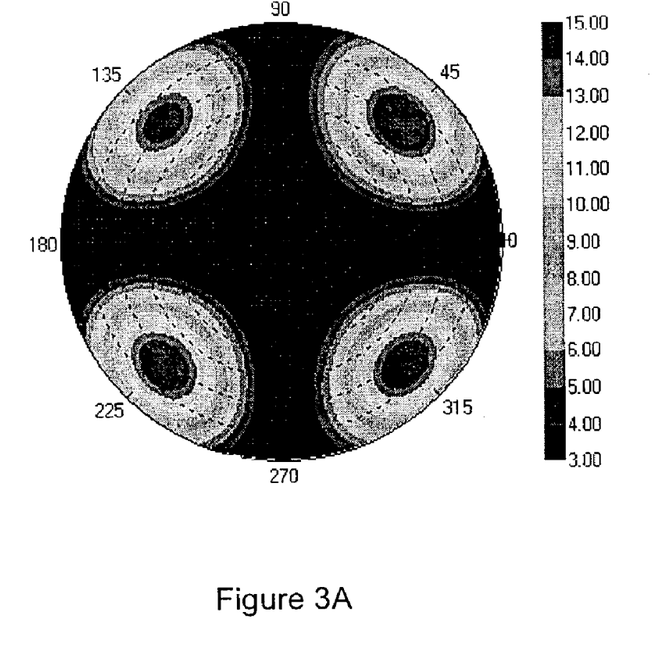
Figure 3B:
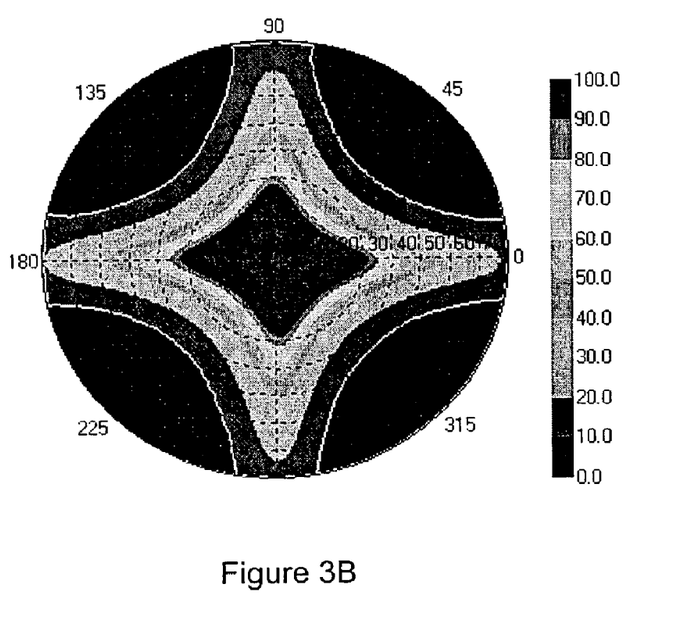

On axis, the crossed polarizers 11, 12 provide a dark state when the cell is un-driven in the vertically aligned, homeotropic state as shown in FIG. 1A. Off axis, two effects result in light leakage which causes reduced contrast ratio and color washout. Firstly, the homeotropically oriented LC retards the polarized light off axis as shown in FIG. 1B, resulting in a non-linear polarization state. Secondly, the transmission axes of the polarizers, which are orthogonal when viewed on-axis as shown in FIG. 2A, are no longer orthogonal when viewed away from either of the transmission directions as shown in FIG. 2B. The dark state light leakage, as shown in the iso-luminance plot of the display depicted in FIG. 3A, leads to reduced contrast in the 45° directions, as shown in the iso-contrast plot of the display depicted in FIG. 3B.

Compensated VA-LCDs have been reported in prior art. Thus, reduction of light leakage through crossed polarizers is well documented and can be achieved using either biaxial or uniaxial films, as reported in Ishinabe, T. Miyashita, T. Uchida and T. Fujimura, Y, "A wide viewing angle polarizer and a quarter wave plate with a wide wavelength range for extremely high quality LCDs". Proceedings of the AD/IDW 2001, p485.

Retardation films with positive or negative birefringence are hereinafter referred to as 'positive' or 'negative' retardation films, respectively.

A combination of two uniaxial films, a positive A-plate aligned with the adjacent polarizer and a positive C-plate will achieve an acceptable dark state for all viewing angles (the terms "A-plate" and "C-plate" are defined below). The homeotropic LC in the undriven state of the VA cell acts as a positive C retardation plate and thus contributes to the compensation effect. However, in a typical VA cell, e.g., 4 µm thickness, there is excessive retardation resulting in overcompensation. This can be cancelled by the addition of a negative C plate to achieve the optimum dark-state.

U.S. Pat. Nos. 6,281,956 and 6,141,075 disclose a VA-LCD comprising a switchable LC layer sandwiched by a first and a second polarizer, and further comprising a positive and a negative retarder. Both the positive and the negative retarder are situated between the display cell and the first polarizer or between the display cell and the second polarizer in order to improve viewing angle and contrast of the display. Further disclosed is a display where the pair of positive and negative retarder is replaced by a biaxial retardation film. For the retardation film it is suggested to use a uniaxially or biaxially stretched plastic film like, for example, a conventional triacetat cellulose (TAC) film, which is typically used in standard displays as protective film covering the polarizers.

However, stretched plastic films like TAC only have very small bireferingence. As the optical retardation is given by the product of the birefringence $\Delta n$ and the film thickness d, a high film thickness of typically several tens or hundreds of microns is required to provide sufficient retardation values, which is a disadvantage for use in flat panel displays. Furthermore, biaxial films are typically manufactured by a process of side-stretching extruded or cast plastics which is difficult to control.

It was also suggested in prior art to use positive and negative retarders comprising layers of polymerized LC material. Thus, it was shown that a layer of cholesteric LC (CLC) material with a short helical pitch and reflection wavelength peak in the UV range of light (UVCLC) retards visible light with negative C symmetry and can be used as a negative C plate retarder. For example, WO 01/20393 discloses a viewing angle compensator comprising a positive A-plate, a negative C-plate and a positive O-plate retarder. The positive A-plate retarder is, for example, made of polymerized LC material with planar structure. The negative C-plate retarder is, for example, made of polymerized UVCLC material. The positive O-plate retarder is, for example, made of polymerized LC material with tilted or splayed structure. WO 01/20393 further discloses that the compensator can be used in LCDs of the TN or VA mode to improve viewing angle and contrast. As the retardation films comprise LC material having high birefringence, the film thickness can be reduced compared to, e.g., stretched plastic films.

However, the use of a stack of three laminated retarders on each side of the display cell increases the total display thickness and the material, and increases manufacturing costs as the LC film retarders are usually manufactured using two piece-to-piece lamination steps. The A-plate must be aligned perpendicular to the polarizer stretch direction, so it cannot be roll-to-roll laminated. The subsequent UVCLC film, which has no preferred alignment direction, is then laminated onto the A-plate also on a piece-to-piece basis. This increases the number of process steps and the material loss when cutting the LC films to pieces.

An aim of the present invention is to provide a compensator for LC displays, in particular for displays of the VA mode, that does not have the drawbacks of prior art compensators, is easy to manufacture and allows economic fabrication even at large scales. Another aim is to provide a compensator which shows good optical performance when used in LC displays, in particular improved grey level stability at wide viewing angles.

A further aim of this invention is to provide a variety of advantageous uses for the compensator according to this invention.

Further aims of this invention relate to liquid crystal displays, in particular to VA mode LCDs comprising an inventive compensator which show advantageous properties such as good contrast, reduced color shift and wide viewing angles.

Other aims of the present invention are immediately evident to the person skilled in the art from the following detailed description.

The above aims among others can be achieved by providing compensators and liquid crystal displays according to the present invention.

SUMMARY OF THE INVENTION

The present invention relates to a compensator comprising at least one positive birefringent retardation film and at least one negative birefringent retardation film.

The invention further relates to the use of a compensator according to the invention in electrooptical displays such as liquid crystal displays.

The invention further relates to a liquid crystal display comprising a compensator according to the invention.

The invention further relates to a liquid crystal display comprising a liquid crystal medium that is switchable between at least two different states by application of an electric field and comprising a compensator according to the invention, wherein the positive birefringent retardation film and the negative birefringent retardation film are located on different sides of the switchable liquid crystal medium.

Definition of Terms

In connection with polarization, compensation and retardation layers, films, or plates, as described in the present application, the following definitions of terms as used throughout this application are given.

The term 'film' as used in this application includes self-supporting, i.e., free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e., groups with the ability to induce liquid crystal phase behavior. Liquid crystal compounds with rod-shaped or board-shaped shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

The term 'director' is known in prior art and means the preferred orientation direction of the long molecular axes (in case of calamitic compounds) or short molecular axis (in case of discotic compounds) of the mesogens in a liquid crystal material.

The term 'planar structure' or 'planar orientation' refers to a film wherein the optical axis is substantially parallel to the film plane.

The term 'homeotropic structure' or 'homeotropic orientation' refers to a film wherein the optical axis is substantially perpendicular to the film plane, i.e., substantially parallel to the film normal.

The terms 'tilted structure' or 'tilted orientation' refers to a film wherein the optical axis is tilted at an angle $\theta$ between 0 and 90 degrees relative to the film plane.

The term 'splayed structure' or 'splayed orientation' means a tilted orientation as defined above, wherein the tilt angle additionally varies monotonuously in the range from 0 to 90°, preferably from a minimum to a maximum value, in a direction perpendicular to the film plane.

In planar, homeotropic and tilted optical films comprising uniaxially positive birefringent liquid crystal material with uniform orientation, the optical axis of the film is given by the director of the liquid crystal material.

The term 'helically twisted structure' relates to a film comprising one or more layers of liquid crystal material wherein the mesogens are oriented with their main molecular axis in a preferred direction within molecular sublayers, said preferred orientation direction in different sublayers being twisted at an angle $\phi$ around a helix axis. The term 'helically twisted structure with planar orientation' means a film with helically twisted structure as described above, wherein the helix axis is substantially perpendicular to the film plane, i.e., substantially parallel to the film normal.

The term 'A plate' refers to an optical retarder utilizing a layer of uniaxially birefringent material with its extraordinary axis oriented parallel to the plane of the layer, and its ordinary axis (also called 'a-axis') oriented perpendicular to the plane of the layer, i.e., parallel to the direction of normally incident light.

The term 'O plate' refers to an optical retarder utilizing a layer of a uniaxially birefringent material with its extraordinary axis (also called 'c-axis') perpendicular to the plane of the layer, i.e., parallel to the direction of normally incident light.

The term 'O plate' refers to an optical retarder utilizing a layer of a uniaxially birefringent material with its extraordinary axis oriented at an oblique angle with respect to the plane of the layer.

A retardation film with positive or negative birefringence is also shortly referred to as 'positive' or 'negative' retardation film, respectively.

An A plate or C plate comprising optically uniaxial birefringent material with positive birefringence is also referred to as '+A/C plate' or 'positive A/C plate'. An A plate or C plate comprising a film of optically uniaxial birefringent material with negative birefringence is also referred to as '−A/C plate' or 'negative A/C plate'.

DETAILED DESCRIPTION OF THE INVENTION

A compensator according to the present invention can be used for compensation of conventional LCDs, in particular those of the DAP (deformation of aligned phases) or VA (vertically aligned) mode, like, e.g., ECB (electrically controlled birefringence), CSH (color super homeotropic), VAN or VAC (vertically aligned nematic or cholesteric) displays, MVA (multi-domain vertically aligned) or PVA (patterned vertically aligned) displays, in displays of the bend mode or hybrid type displays, like, e.g., OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays.

Preferred are VA, MVA, PVA, OCB and pi-cell displays.

A compensator according to the present invention preferably comprises a positive A plate retardation film and a negative C plate retardation film.

Suitable optical films for use as positive A plate retarders are known in prior art, like, for example, uniaxially stretched polymer films such as polyethyleneterephthalate (PET), polyvinylalcohol (PVA) or polycarbonate (PC) films.

Suitable optical films for use as negative C plate retarders are known in prior art, like, for example, stretched or uniaxially compressed plastic films like DAC or TAC as described, e.g., in U.S. Pat. No. 4,701,028, inorganic thin films obtained by physical vapor deposition as described, e.g., in U.S. Pat. No. 5,196,953, or negatively birefringent polyimide films as described, e.g., in U.S. Pat. No. 5,480,964 or U.S. Pat. No. 5,395,918.

Preferred are the following embodiments the compensator comprises one positive A plate retardation film and one negative C plate retardation film, the positive and the negative retardation film comprise a polymerized or crosslinked LC material, the positive and the negative retardation film are situated in an LCD on different sides of the switchable LC medium, the positive retardation film comprises a polymerized or crosslinked achiral LC material with planar orientation, the negative retardation film comprises a polymerized or crosslinked cholesteric LC (CLC) material with helically twisted structure and planar orientation, the helical pitch of the CLC material in the negative retardation film is smaller than 250 nm, the thickness of the positive retardation film is from 0.1 to 3 µm, preferably from 0.5 to 1.5 µm, the thickness of the negative retardation film is from 1 to 4 µm, preferably from 2 to 3 µm, the optical retardation of the positive retardation film is from 30 to 200 nm, preferably from 50 to 150 nm, the optical retardation of the negative retardation film is from 50 to 400 nm, preferably from 100 to 250 nm, In a preferred embodiment of the present invention the positive and negative retardation films comprise polymerized or crosslinked LC material. The positive retarder is preferably a positive A plate retardation film comprising polymerized LC material with planar structure as described, for example, in WO 98/04651. The negative retarder is preferably a negative C plate retardation film comprising polymerized chiral LC, in particular cholesteric LC (CLC) material with a short pitch and a reflection in the UV range, such as a UVCLC film or highly twisted A plate as described, for example, in GB 2,315,072, WO 01/20393 and WO 01/20394.

As described above, a negative UVCLC film has a manufacturing advantage compared to conventional stretched plastic retarder. The advantage is that the direction of alignment can be set at any angle and the retardation determined by the twist and the thickness of the film. This will allow roll-to-toll coating rather than piece-to-piece lamination with other optical films, like the polarizers, where non-parallel alignment of the optical axes is required. Furthermore, by using LC material, the thickness of the films can be reduced and the birefringence can easily be controlled by appropriate choice of the LC material. Preferred ranges for the birefringence are >0.1, in particular from 0.1 to 0.3. Thus, the desired retardation can be provided in a simple and easily controllable way.

In another preferred embodiment of the present invention, the positive and the negative retardation film are situated in an LCD on different sides of the switchable liquid crystal medium. Preferably each of the positive and negative retardation film are adjacent to a polarizer.

Figure 4:
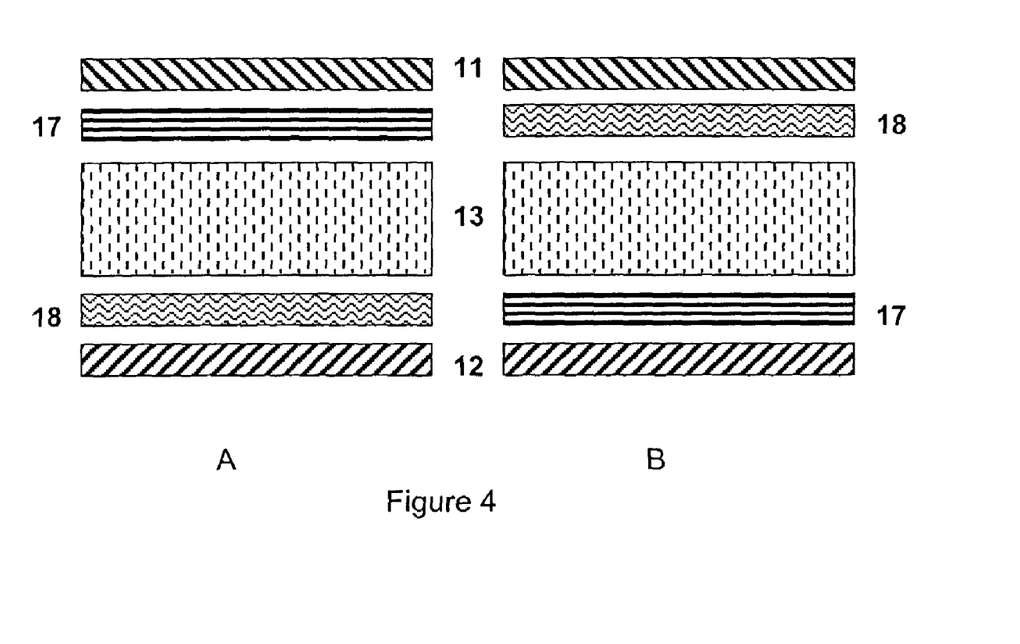
FIG. 4A and FIG. 4B schematically depict a compensated MVA-LC display according to the present invention.

This is schematically depicted in FIG. 4, showing a display comprising an LC cell 13 with a switchable LC medium between two substrates that is sandwiched by a first polarizer 11 and a second polarizer 12, and further comprising a positive retardation film 17 and a negative retardation film 18. The positive retardation film 17 is preferably a positive A plate retardation film comprising polymerized LC material with planar structure. The negative retardation film 18 is preferably a negative C plate retardation film comprising polymerized chiral LC, in particular cholesteric LC (CLC) material with helically twisted structure and planar orientation having a short pitch and a reflection in the UV range, such as a UVCLC film. The positive and negative retardation film 17, 18 can be placed on either side of the LC cell 13 as shown in FIGS. 4A and 4B, without a significant effect on the optical performance.

If retardation films made of LC material as mentioned above are used, separation of the two retarders and placing them on the polarizers on opposite sides of the cell allows ease of manufacturing without a reduction, or even with an improvement, of the optical performance. As described above, the negative C plate UVCLC film is roll-to-roll laminated onto the polarizer, providing a cheap continuous process. The positive A plate LC film is cut and piece-to-piece laminated to the polarizer such that the optical axis of the A plate and the polarization absorption axis of the polarizer are oriented at 90° to each other. LC film pieces that have defects due to manufacture can be discarded prior to lamination to the expensive polarizer. This improves the total yield regarding the consumed amount of optical films, as only inexpensive LC film has to be eventually discarded. This is an advantage compared to compensators of prior art, like, e.g., those described in WO 01/20393, comprising a stack of three different films, one O plate, one A plate and one C plate retarder, which have to be laminated piece-to-piece onto each other and onto a polarizer.

Furthermore, the separation of the positive and negative film leads to an improved optical performance when used in an LC display.

An LCD comprising a positive and negative retardation film as described above an below is another aspect of the invention. Especially preferred is an LCD comprising the following components a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates that is switchable between at least two different states by application of an electric field, a first linear polarizer on one side of the liquid crystal cell, a second linear polarizer on the side of the liquid crystal cell opposite to that of said first linear polarizer, at least one positive retardation film and at least one negative retardation film as described above and below, said films being situated on opposite sides of the liquid crystal cell, it being possible for the above components to be separated, stacked, mounted on top of each other, coated on top of each other or connected by means of adhesive layers.

Preferred is an LCD, wherein the switchable LC medium exhibits a negative dielectric anisotropy and the LC molecules of the switchable liquid crystal medium exhibit a substantially homeotropic orientation when no electric field is applied.

Preferably, the LCD is a display of the vertically aligned (VA), multidomain VA (MVA) or patterned VA (PVA) mode. Displays of these types are generally known in the art.

The individual optical components of the LCD according to the invention, such as the LC cell, the individual retarders and the linear polarizers, can be separated or can be laminated to other components. They can be stacked, mounted on top of each other or be connected, e.g., by means of adhesive layers. In case of films comprising polymerized LC material, it is also possible that stacks of two or more films are prepared by coating the LC material of one film directly onto another film, the latter serving as substrate.

The LCDs according to the present invention may further comprise one or more further optical components, such as polarizers or compensation or retardation films, like, for example, A, O or C plates, or retardation films with twisted, homeotropic, planar, tilted or splayed structure. Preferred are optical films comprising polymerized or crosslinked LC material. Tilted or splayed LC films are described, for example, in U.S. Pat. No. 5,619,352, WO 97/44409, WO 97/44702, WO 97/44703 and WO 98/12584. Homeotropic LC films are described, for example, in WO 98/00475. Planar LC films are described, for example, in WO 98/04651.

The LCD according to the present invention may be a reflective or transmissive display, and may further comprise a light source, like a conventional backlight, or a reflective layer on the side of the LC cell opposite to that of the first linear polarizer. In case of a reflective display with a reflective layer on one side of the LC cell, a second linear polarizer may be omitted.

The negative and positive retarders of the inventive compensator are preferably prepared from a polymerizable LC material by in-situ polymerization. In a preferred method of preparation the polymerizable LC material is coated onto a substrate, oriented into the desired orientation and subsequently polymerized, for example, by exposure to heat or actinic radiation as described, for example, in WO 01-20394, GB 2,315,072 and WO 98/04651.

In case of a UVCLC film, the polymerizable LC material preferably comprises one or more achiral polymerizable mesogenic compounds and at least one chiral compound. The chiral compound can be selected from non-polymerizable chiral compounds, like, e.g., conventional chiral dopants, polymerizable chiral non-mesogenic or polymerizable chiral mesogenic compounds.

In case of the planar LC film, the polymerizable LC material preferably comprises one or more achiral polymerizable mesogenic compounds.

In general, the polymerizable LC material preferably comprises at least one polymerizable mesogen having one polymerizable functional group (monoreactive compound) and at least one polymerizable mesogen having two or more polymerizable functional groups (di- or multireactive compound).

If di- or multireactive compounds are present in the polymerizable material, a three-dimensional polymer network is formed and the orientation of the LC material is permanently fixed. An optical retardation film made of such a network is self-supporting and shows a high mechanical and thermal stability and a low temperature dependence of its physical and optical properties.

By varying the concentration of the di- and multireactive compounds the crosslink density of the polymer film, and thereby its physical and chemical properties, such as the glass transition temperature, which is also important for the temperature dependence of the optical properties of the optical retardation film, the thermal and mechanical stability or the solvent resistance can be tuned easily.

The polymerizable mesogenic mono-, di- or multireactive compounds used for the instant invention can be prepared by methods which are known per se and which are described, for example, in standard works of organic chemistry, such as, for example, Houben-Weyl, Methoden der organischen Chemie, Thieme-Verlag, Stuttgart. Typical examples are described, for example, in WO 93/22397; EP 0 261 712; DE 19504224; DE 4408171 and DE 4405316. The compounds disclosed in these documents, however, are to be regarded merely as examples that do not limit the scope of this invention.

Examples representing especially useful mono- and direactive polymerizable mesogenic compounds are shown in the following list of compounds, which should, however, be taken only as illustrative and is in no way intended to restrict, but instead to explain the present invention:

-continued

In the above formulae, P is a polymerizable group, preferably an acryl, methacryl, vinyl, vinyloxy, propenyl ether, epoxy or styrene group, x and y are, each independently, 1 to 12, A and D are, each independently, 1,4-phenylene that is optionally mono- di or trisubstituted by $L^1$ or 1,4-cyclohexylene, v is 0 or 1, $Z^0$ is —COO—, —OCO—, —CH$_2$CH$_2$— or a single bond, Y is a polar group, $R^0$ is a non-polar alkyl or alkoxy group, Ter is a terpenoid radical, like, e.g., menthyl, Chol is a cholesteryl group, and $L^1$ and $L^2$ are, each independently, H, F, Cl, CN or an optionally halogenated alkyl, optionally halogenated alkoxy, optionally halogenated alkylcarbonyl, optionally halogenated alkoxycarbonyl or optionally halogenated alkoxycarbonyloxy group, each having up to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms, or a mono-, oligo- or polyfluorinated alkyl or alkoxy group with 1 to 4 C atoms.

The term 'unpolar group' means an alkyl group with 1 or more, preferably, 1 to 12 C atoms, or an alkoxy group with 2 or more, preferably, 2 to 12 C atoms.

In case of polymerizable LC mixtures comprising one or more chiral dopants, the dopants can be selected, e.g., from the commercially available R or S 811, R or S 1011, R or S 2011 or CB 15 (from Merck KGaA, Darmstadt, Germany).

Preferred are chiral dopants with a high helical twisting power (HTP), in particular, dopants comprising a sorbitol group as described in WO 98/00428, dopants comprising a hydrobenzoin group as described in GB 2,328,207, chiral binaphthyl derivatives as described in EP 01111954.2, chiral binaphthol acetal derivatives as decribed in EP 01104842.8, chiral TADDOL derivatives as described in WO 02/06265, and chiral dopants with at least one fluorinated linkage group and a terminal or central chiral group as described in WO 02/06196 and WO 02/06195.

As a substrate for the preparation of the polymer films, for example, a glass or quartz sheet or a plastic film or sheet can be used. It is also possible to put a second substrate on top of the coated mixture prior to and/or during and/or after polymerization. The substrates may or may not be removed after polymerization. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably, isotropic substrates are used.

Preferably, at least one substrate is a plastic substrate, such as, for example, a film of polyester, such as polyethyleneterephthalate (PET), polyvinylalcohol (PVA), polycarbonate (PC) or triacetylcellulose (TAC), especially preferably, a PET film or a TAC film. As a birefringent substrate, for example, an uniaxially stretched plastic film can be used. For example, PET films are commercially available from ICI Corp. under the trade name Melinex.

The polymerizable material can also be dissolved in a solvent, preferably, in an organic solvent. The solution is then coated onto the substrate, for example, by spin-coating or other known techniques, and the solvent is evaporated off before polymerization. In most cases it is suitable to heat the mixture in order to facilitate the evaporation of the solvent.

Polymerization of the LC material is preferably achieved by exposing it to actinic radiation. Actinic radiation means irradiation with light, like UV light, IR light or visible light, irradiation with X-rays or gamma rays or irradiation with high energy particles, such as ions or electrons. Preferably, polymerization is carried out by photoirradiation, in particular, with UV light, very preferably, with linear polarized UV light. As a source for actinic radiation, for example, a single UV lamp or a set of UV lamps can be used. When using a high lamp power the curing time can be reduced. Another possible source for photoradiation is a laser, like, e.g., a UV laser, an IR laser or a visible laser.

Polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction. UV photoinitiators are preferred, in particular, radicalic UV photoinitiators. As standard photoinitiator for radical polymerization for example, the commercially available Irgacure® 651, Irgacure® 184, Darocure® 1173 or Darocure® 4205 (all from Ciba Geigy AG) can be used, whereas in case of cationic photopolymerization the commercially available UVI 6974 (Union Carbide) can be used.

The polymerizable LC material can additionally comprise one or more other suitable components, such as, for example, catalysts, sensitizers, stabilizers, chain-transfer agents, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colorants, dyes or pigments.

In another preferred embodiment the mixture of polymerizable material comprises up to 70%, preferably, 1 to 50% of a monoreactive non-mesogenic compound with one polymerizable functional group. Typical examples are alkyl acrylates or alkyl methacrylates with alkyl groups of 1 to 20 C atoms.

It is also possible, in order to increase crosslinking of the polymers, to add up to 20% of a non-mesogenic compound with two or more polymerizable functional groups to the polymerizable LC material alternatively or in addition to the di- or multireactive polymerizable mesogenic compounds to increase crosslinking of the polymer. Typical examples for direactive non-mesogenic monomers are alkyl diacrylates or alkyl dimethacrylates with alkyl groups of 1 to 20 C atoms. Typical examples for multireactive non-mesogenic monomers are trimethylpropane trimethacrylate or pentaerythritol tetraacrylate.

It is also possible to add one or more chain transfer agents to the polymerizable material in order to modify the physical properties of the polymer film. Preferred are thiol compounds, such as monofunctional thiol compounds, like e.g., dodecane thiol or multifunctional thiol compounds, like e.g., trimethylpropane tri(3-mercaptopropionate), very preferably, mesogenic or liquid crystalline thiol compounds. When adding a chain transfer agent, the length of the free polymer chains and/or the length of the polymer chains between two crosslinks in the inventive polymer film can be controlled. When the amount of the chain transfer agent is increased, the polymer chain length in the obtained polymer film is decreasing.

Planar alignment can be achieved, for example, by shearing the material, e.g., by means of a doctor blade. It is also possible to apply an alignment layer, for example, a layer of rubbed polyimide or sputtered $SiO_x$ on top of at least one of the substrates. Planar alignment can also be achieved by rubbing the substrate without applying an additional alignment layer, e.g., by means of a rubbing cloth or a rubbing roller. If a rubbed substrate is used for the preparation of a retardation film according to the invention, the direction of the optical axis of the film usually corresponds to the rubbing direction of the substrate.

Planar alignment with a low tilt angle can also be achieved or enhanced by adding one or more surfactants to the polymerizable mesogenic material. Suitable surfactants are described, for example, in J. Cognard, Mol.Cryst.Liq.Cryst. 78, Supplement 1, 1-77 (1981). Preferred are non-ionic surfactants, e.g., non-ionic fluorocarbon surfactants, like the commercially available Fluorad® (from 3M), or Zonyl FSN® (from DuPont).

Alternatively to the method described above it is possible to prepare the retardation films from a readily synthesized LC polymer that is applied onto a substrate, for example, at a temperature above its glass transition temperature or its melting point, or from solution, e.g., in an organic solvent, aligned into the desired orientation, and solidified, e.g., by evaporating the solvent or by cooling below the glass temperature or melting point of the LC polymer. If, for example, a LC polymer with a glass temperature that is higher than ambient temperature is used, evaporation of the solvent or cooling leaves a solid LC polymer film. If, for example, an LC polymer with a high melting point is used, the LC polymer can be applied as a melt onto the substrate which solidifies upon cooling. LC side chain polymers or LC main chain polymers can be used, preferably, LC side chain polymers. The LC polymer should preferably be selected such that its glass transition or melting temperature is significantly higher than the operating temperature of the retarder. For example, LC side chain polymers comprising a polyacrylate, polymethacrylate, polysiloxane, polystyrene or epoxide backbone with laterally attached mesogenic side chains can be used. The LC polymer may also comprise side chains with reactive groups that can be crosslinked after or during evaporation of the solvent to permanently fix the orientation. The LC polymer may also be subjected to mechanical or heat treatment after application to the substrate to improve alignment. The above methods and suitable materials are known to those skilled in the art.

The examples below serve to illustrate the invention without limiting it. In the foregoing and the following, all temperatures are given in degrees Celsius, and all percentages are by weight, unless stated otherwise.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Preparation of a Negative Retarder

The following polymerizable mixture was formulated

| | |
|---|---|
| Compound (1) | 48.5% |
| Compound (2) | 7.5% |
| Compound (3) | 10.5% |
| Compound (4) | 21.5% |
| Paliocolor LC756 ® | 7.5% |
| Irgacure 907 ® | 4.0% |
| Fluorad FC171 ® | 0.5% |

(3)

(4)

Compounds (2) and (4) can be prepared according to or in analogy to the methods described in D. J. Broer et al., Makromol.Chem. 190, 3201-3215 (1989). The direactive compounds (1) and (3) can be prepared as described in WO 93/22397. Paliocolor LC756 is a commercially available chiral polymerizable material (from BASF AG, Ludwigshafen, Germany). Irgacure 907 is a commercially available photoinitiator (from Ciba AG, Basel, Switzerland). Fluorad FC 171 is a commercially available non-ionic fluorocarbon surfactant (from 3M).

A polymer film with helically twisted structure and planar alignment was prepared from the above mixture by coating onto a substrate and curing under UV light as described in example 3 of WO 01/20394. The resulting polymer film shows negative C symmetry with a retardation of 140 nm and a thickness of 2.5 μm.

EXAMPLE 2

Preparation of a Positive Retarder

The following polymerizable mixture was formulated

| Compound (1) | 42.25% |
| Compound (2) | 32.86% |
| Compound (5) | 18.78% |
| Irgacure 907 ® | 5.63% |
| FC171 ® | 0.48% |

(5)

Compound (5) and its preparation are described in GB 2,280,445.

A polymer film with planar structure was prepared from the above mixture by coating onto a rubbed substrate and curing under UV light as described in example 1 of WO 98/04651. The resulting polymer film shows positive A symmetry with a retardation of 90 nm and a thickness of 0.8 μm.

EXAMPLE 3

A negative LC polymer retardation film is manufactured as described in example 1 on a roll and roll-to-roll laminated to a linear polarizer. As linear polarizer a commercially available dichroic polarizer is used, comprising a stretched PVA film dyed by either iodine or dichroic dye both surfaces of which are protected by TAC films. The typical optical properties are polarizing efficiency of 99.95% and single transmittance of 43%. The stretching direction is parallel to the absorption axis of polarizer.

A positive LC polymer retardation film is manufactured as described in example 2, cut into pieces and the pieces are piece-to-piece laminated to the polarizer such that the optical axis of the positive retarder and the polarization absorption axis of the polarizer are oriented at 90° to each other. LC polymer pieces that have defects due to manufacture can be discarded prior to lamination to the polarizer, thus improving the total yield with respect to the amount of the expensive polarizer consumed.

Figure 5:
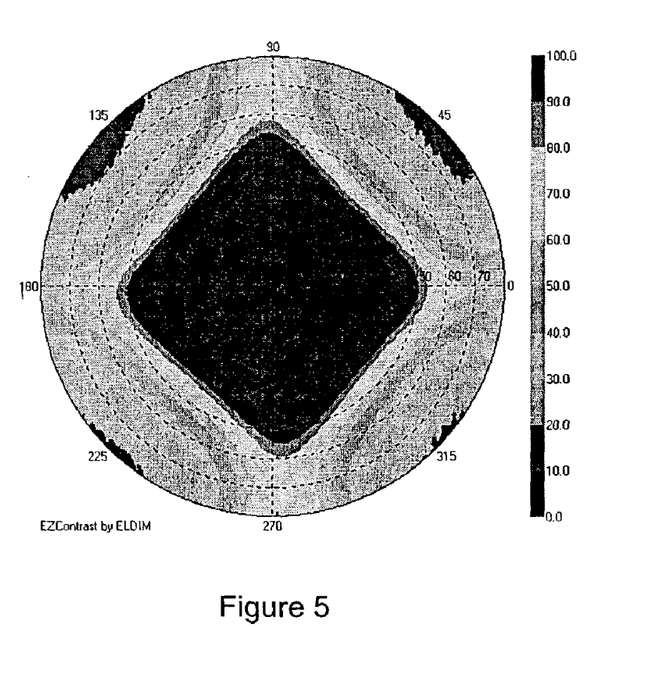
FIG. 5 shows the iso-luminance plot of a compensated display according to example 3 of the present invention.

The two films are put on different sides of a VA-cell as depicted in FIG. 4. The isocontrast plot of the compensated display is shown in FIG. 5. The display shows a good contrast and a high color stability over a wide range of viewing angles.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited herein and of corresponding European application No. 02010984.9, filed May 17, 2002 is incorporated by reference herein.

The invention claimed is:

1. A liquid crystal display comprising in a layer, a nematic liquid crystal medium that is switchable between at least two different states by application of an electric field, and a compensator comprising only one positive A plate retardation film and only one negative C plate retardation film, wherein the positive A plate retardation film and the negative C plate retardation film are located on different sides of the switchable liquid crystal medium, wherein the positive and the negative retardation films comprise polymerized or crosslinked liquid crystal material, and liquid crystalline molecules in the liquid crystalline medium orient substantially parallel to the plane of the layer when a electric field is applied, the display further comprising a polarizer on each side of the switchable liquid crystal medium, wherein one polarizer is laminated to the positive A plate retardation film such that the optical axis of the A plate and the polarization absorption axis of the polarizer are oriented at 90° to each other, and the other polarizer is laminated to the negative C plate, and wherein the positive A plate and the adjacent polarizer are laminated piece-to-piece and the negative C plate and the adjacent polarizer are laminated roll-to-roll.

2. A liquid crystal display according to claim 1, wherein the positive A plate retardation film comprises polymerized or crosslinked achiral liquid crystal material with planar orientation.

3. A liquid crystal display according to claim 1, wherein the negative C plate retardation film comprises polymerized or crosslinked chiral liquid crystal material with helically twisted structure and planar orientation.

4. A liquid crystal display comprising a nematic liquid crystal medium that is switchable between at least two different states by application of an electric field, and a compensator comprising at least one positive A plate retardation film and at least one negative C plate retardation film, wherein a positive A plate retardation film and a negative C plate retardation film are located on different sides of the switchable liquid crystal medium, wherein the negative C plate retardation film comprises apolymerized or crosslinked chiral liquid crystal material with helically twisted structure and planar orientation wherein the chiral liquid crystal medium in the negative C plate retardation film has a helical pitch of less than 250 nm, and liquid crystalline molecules in the liquid crystalline medium orient substantially parallel when a electric field is applied, the display further comprising a polarizer on each side of the switchable liquid crystal medium, wherein one polarizer is laminated to the positive A plate retardation film such that the optical axis of the A plate and the polarization absorption axis of the polarizer are oriented at 90° to each other, and the other polarizer is laminated to the negative C plate.

5. A liquid crystal display comprising a liquid crystal medium that is switchable between at least two different states by application of an electric field, and a compensator comprising at least one positive A plate retardation film and at least one negative C plate retardation film, wherein a positive A plate retardation film and a negative C plate retardation film are located on different sides of the switchable liquid crystal medium,
wherein the thickness of the positive retardation film is 0.5 to 1.5 μm, and liquid crystalline molecules in the liquid crystalline medium orient substantially parallel when a electric field is applied, the display further comprising a polarizer on each side of the switchable liquid crystal medium, wherein one polarizer is laminated to the positive A plate retardation film such that the optical axis of the A plate and the polarization absorption axis of the polarizer are oriented at 90° to each other, and the other polarizer is laminated to the negative C plate.

6. An electrooptical or liquid crystal, display comprising the following components
a liquid crystal cell formed by two transparent substrates having surfaces which oppose each other, an electrode layer provided on the inside of at least one of said two transparent substrates and optionally superposed with an alignment layer, and a nematic liquid crystal medium which is present between the two transparent substrates that is switchable between at least two different states by application of an electric field,
a first linear polarizer on one side of the liquid crystal cell,
a second linear polarizer on the side of the liquid crystal cell opposite to that of said first linear polarizer, and
one positive A plate retardation film and one negative C plate retardation film, wherein the positive A plate retardation film, and the negative C plate retardation film are situated on opposite sides of the liquid crystal cell, wherein the switchable liquid crystal medium exhibits a negative dielectric anisotropy and the liquid crystal molecules of the switchable liquid crystal medium exhibit a substantially homeotropic orientation when no electric field is applied, and liquid crystalline molecules in the liquid crystalline medium orient substantially parallel to the cell when a electric field is applied, the display further comprising a polarizer on each side of the switchable liquid crystal medium, wherein one polarizer is laminated to the positive A plate retardation film such that the optical axis of the A plate and the polarization absorption axis of the polarizer are oriented at 90° to each other, and the other polarizer is laminated to the negative C plate, and wherein the positive A plate and the adjacent polarizer are laminated piece-to-piece and the negative C plate and the adjacent polarizer are laminated roll-to-roll.

7. A liquid crystal display according to claim 6, wherein the display is a vertically aligned, a multidomain vertically aligned or a patterned vertically aligned mode display.

8. A process for preparing a liquid crystal display according to claim 1, comprising adhering with an adhesive layer or laminating together the positive A plate retardation film and a cell containing the switchable liquid crystal medium and/or the negative C plate retardation film and a cell containing the switchable liquid crystal medium, or coating the positive birefringement retardation film onto a cell containing the switchable liquid crystal medium and/or the negative birefringement retardation film onto a cell containing the switchable liquid crystal medium, the display further comprising a polarizer on each side of the switchable liquid crystal medium, wherein one polarizer is laminated to the positive A plate retardation film such that the optical axis of the A plate and the polarization absorption axis of the polarizer are oriented at 90° to each other, and the other polarizer is laminated to the negative C plate, and wherein the positive A plate and the adjacent polarizer arc laminated piece-to-piece and the negative C plate and the adjacent polarizer are laminated roll-to-roll.

9. A process for preparing a liquid crystal display according to claim 6, comprising adhering with an adhesive layer or laminating together the components, or coating a component onto another component.

10. A liquid crystal display according to claim 1, wherein the liquid crystal material in the compensator comprises one or more achiral polymerizable mesogenic compounds.

11. A liquid crystal display according to claim 1, wherein the liquid crystal material in the compensator comprises one or more achiral polymerizable mesogenic compounds and at least one chiral compound.

12. A liquid crystal display according to claim 1, wherein the liquid crystal material in the compensator comprises at least one polymerizable monoreactive mesogen and at least one polymerizable di- or multi-reactive mesogen.

13. A liquid crystal display according to claim 1, wherein the liquid crystal material in the compensator comprises one or more compounds of formulae (Ia) through (Iq) and (IIa) though (IIe)

-continued (IId)

(IIe)

wherein
P is a polymerizable group,
x and y are, each independently, 1 to 12,
A and D are, each independently, 1,4-phenylene that is optionally mono-, di-, or tri-substituted with $L^1$ or 1,4-cyclohexylene,
v is 0 or 1,
$Z^o$ is —COO—, —OCO—, —CH$_2$CH$_2$— or a single bond,
Y is a polar group,
$R^o$ is a non-polar alkyl or alkoxy group,
Ter is a terpenoid radical,
Chol is a cholesteryl group,
$L^1$ and $L^2$ are, each independently, H, F, Cl, CN, or an optionally halogenated alkyl, alkoxy, alkylcarbonyl, alkoxycarbonyl, or alkoxycarbonyloxy group, each having up to 7 carbon atoms.

14. A liquid crystal display according to claim 1, wherein the liquid crystal material in the compensator comprises up to 70% of a monoreacticve non-mesogenic compound.

15. A liquid crystal display according to claim 1, wherein the liquid crystal material in the compensator comprises up to 20% of a di- or multi-reactive polymerizable non-mesogenic compound.

16. A liquid crystal display according to claim 4, wherein the display has one positive A plate retardation film and one negative C plate retardation film.

17. A liquid crystal display according to claim 5, wherein the display has one positive A plate retardation film and one negative C plate retardation film.

18. A liquid crystal display according to claim 4, comprising the following components
a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates that is switchable between at least two different states by application of an electric field,
a first linear polarizer on one side of the liquid crystal cell,
a second linear polarizer on the side of the liquid crystal cell opposite to that of said first linear polarizer, and
one positive A plate retardation film arid one negative C plate retardation film, wherein the positive birefringent retardation film, and the negative birefringent retardation film are situated on opposite sides of the liquid crystal cell, the display further comprising a polarizer on each side of the switchable liquid crystal medium, wherein one polarizer is laminated to the positive A plate retardation film such that the optical axis of the A plate and the polarization absorption axis of the polarizer are oriented at 90° to each other, and the other polarizer is laminated to the negative C plate, and wherein the positive A plate and the adjacent polarizer are laminated piece-to-piece and the negative C plate and the adjacent polarizer are laminated roll-to-roll.

19. A liquid crystal display according to claim 18, wherein the switchable liquid crystal medium exhibits a negative dielectric anisotropy and the liquid crystal molecules of the switchable liquid crystal medium exhibit a substantially homeotropic orientation when no electric field is applied.

20. A liquid crystal display according to claim 19, wherein the display is a vertically aligned, a multidomain vertically aligned or a patterned vertically aligned mode display.

* * * * *